(12) United States Patent
Yoneoka

(10) Patent No.: US 7,645,107 B2
(45) Date of Patent: Jan. 12, 2010

(54) PUSH NUT

(75) Inventor: Akira Yoneoka, Kanagawa (JP)

(73) Assignee: Piolax Inc., Kanagawa-ken (JP)

( * ) Notice: Subject to any disclaimer, the term of this patent is extended or adjusted under 35 U.S.C. 154(b) by 634 days.

(21) Appl. No.: 11/404,018

(22) Filed: Apr. 14, 2006

(65) Prior Publication Data
US 2006/0245843 A1 Nov. 2, 2006

(30) Foreign Application Priority Data
Apr. 28, 2005 (JP) ............................ P2005-132808

(51) Int. Cl.
*F16B 37/16* (2006.01)
*F16B 21/18* (2006.01)
(52) U.S. Cl. .................. 411/437; 411/523; 411/433
(58) Field of Classification Search ................ 411/433, 411/437, 525, 523, 524, 521, 177
See application file for complete search history.

(56) References Cited

U.S. PATENT DOCUMENTS

| 1,243,859 A * | 10/1917 | Neider | 24/578.12 |
| 2,342,910 A * | 2/1944 | Tinnerman | 285/200 |
| 4,245,484 A * | 1/1981 | Block | 63/12 |
| 4,508,477 A * | 4/1985 | Oehlke et al. | 411/174 |
| 4,775,273 A * | 10/1988 | Bauer | 411/517 |
| 4,911,594 A * | 3/1990 | Fisher | 411/437 |
| 5,897,281 A * | 4/1999 | Haga et al. | 411/525 |
| 6,227,785 B1 * | 5/2001 | Kilgore | 411/526 |
| 6,997,662 B2 * | 2/2006 | Nishikawa | 411/437 |
| 7,207,762 B2 * | 4/2007 | Teal | 411/526 |
| 2008/0286066 A1 * | 11/2008 | Paquet | 411/177 |

FOREIGN PATENT DOCUMENTS

| EP | 0 750 122 B1 | 11/2001 |
| EP | 1 182 369 A2 | 2/2002 |

* cited by examiner

*Primary Examiner*—Victor Batson
*Assistant Examiner*—David C Reese
(74) *Attorney, Agent, or Firm*—McGinn IP Law Group, PLLC

(57) ABSTRACT

A push nut including a base plate formed with a bolt passing hole at a center of the base plate and four engaging pieces. Pairs of engaging pieces extend respectively from a pair of opposing sides of the base plate, base portions of the four engaging pieces are folded back to have a U-shape, and tip end portions of the engaging pieces extend to a surrounding of the bolt passing hole. The tip end portions of the four engaging pieces surround a periphery of the bolt passing hole. The four engaging pieces incline toward an insertion direction of a bolt and elastically abut against an outer circumference of the bolt, which is inserted into the bolt passing hole.

20 Claims, 8 Drawing Sheets

PUSH NUT

BACKGROUND OF THE INVENTION

1. Field of the Invention

The present invention relates to a push nut which is caused to engage with a thread groove of a bolt simply by being pushed onto the bolt, and which functions as a nut.

2. Description of the Related Art

A push nut which can be fixed simply by pushing onto a bolt does not require a tool such as a wrench, and has good attachment workability. Therefore, a push nut is used as means for attaching a part of an automobile or the like, and particularly suitable for use in the case where a work of attaching a part must be gropingly conducted while inserting a hand into a narrow space.

EP 0750122A1 discloses a push nut including: a base plate in which a bolt passing hole is disposed in a center portion; and two engaging pieces which extend from a pair of opposing sides of the base plate, respectively. In the engaging pieces, base portions are folded back into a U-shape, and tip end portions extend to a surrounding of the bolt passing hole. The push nut is configured so that, when a bolt is pushed into the bolt passing hole, the two engaging pieces are fitted into a thread groove of the bolt, thereby performing locking.

EP1182369A2 discloses a push nut including: a base plate which is substantially circular, and in which a bolt passing hole is disposed in a middle portion; and three engaging pieces which extend from three circumferential positions of the base plate, respectively. In the engaging pieces, base portions are folded back into a U-like shape, and tip end portions extend to a surrounding of the bolt passing hole. The push nut is configured so that, when a bolt is pushed into the bolt passing hole, the three engaging pieces are fitted into a thread groove of the bolt, thereby performing locking.

SUMMARY OF THE INVENTION

In the push nut of EP 0750122A1 above, in a process of pushing onto a bolt, however, the push nut easily inclines with respect to the bolt. When the push nut inclines with respect to the bolt, there is a case where, even when a large force is applied, the push nut cannot be further pushed onto the bolt. Furthermore, there is a case where one of the engaging pieces fails to engage with the thread groove although the other engaging piece engages with the thread groove, thereby causing rattling.

The push nut of EP1182369A2 above has a problem in that, during production, the engaging pieces must be bent respectively in three directions, and hence press molding is hardly conducted. The push nut has another problem in that, in a developed state, it has a shape in which the engaging pieces radially extend from the outer circumference of the base plate, and hence material yield is low. Moreover, the push nut must be inserted while the three engaging pieces are pressed by fingers. In a narrow space where a hand can be inserted but only the index and mid fingers can reach the engaging pieces, therefore, it is sometimes difficult to work.

The present invention has been made in view of the above circumstances and provides a push nut. According to one aspect of the invention, a push nut can be easily inserted onto a bolt, and the inserting work of the push nut can be done while the nut is pressed by two fingers, and the material yield of the push nut is high.

According to a first aspect of the invention there is provided a push nut including: a base plate formed with a bolt passing hole at a center of the base plate; and four engaging pieces wherein pairs of engaging pieces extend respectively from a pair of opposing sides of the base plate, base portions of the four engaging pieces are folded back to have a U-shape, and tip end portions of the engaging pieces extend to a surrounding of the bolt passing hole; wherein the tip end portions of the four engaging pieces surround a periphery of the bolt passing hole; and wherein the four engaging pieces incline toward an insertion direction of a bolt and elastically abut against an outer circumference of the bolt, which is inserted into the bolt passing hole.

According to the above configuration, a tip end portion of the bolt is inserted into the bolt passing hole of the base plate from the lower face side that is not in the direction along which the engaging pieces are folded back, and the push nut is pressed toward the base end of the bolt while the engaging pieces of the push nut are pressed by fingers. Then, the tip end portions of the four engaging pieces move toward a base end of the bolt while overriding the thread of the bolt, and, at positions where the base plate is in contact with an attached member, the tip end portions of the engaging pieces engage with a thread groove of the bolt to perform locking. In this case, a required locking force is ensured by the coupling forces of the four engaging pieces. Therefore, the widths of the engaging pieces can be reduced, and the insertion force to be applied on the bolt can be reduced to a relatively small degree. In the process of pushing onto the bolt, the push nut hardly inclines with respect to the bolt. Even when the push nut inclines with respect to the bolt, the case where insertion is disabled does not occur. Therefore, the workability of attachment can be improved. Two of the engaging pieces extend from each of the pair of opposing sides of the base plate. Therefore, the push nut can be pushed by two fingers while two engaging pieces are simultaneously pressed by one of the fingers, and the push nut can be easily attached even in the case where the attachment work is conducted in a space where only the index and mid fingers can reach the engaging pieces. Since two of engaging pieces extend from each of the pair of opposing sides of the base plate, the shape in a developed state can be compact, and the material yield of the production process can be improved.

According to a second aspect of the invention, there is provided a push nut according to the first aspect wherein one of the engaging pieces of each pair of the engaging pieces is narrower in the tip end portion than another of the engaging pieces of the each pair of the engaging pieces extended from a same side as the one of the engaging pieces; and wherein the ones of the engaging pieces being narrower in the tip end portions are obliquely opposed to each other.

According to the above configuration, when pressed by fingers, the engaging piece of which the tip end portion is narrowed bends more flexibly, and moves more downward. As a result, when the engaging pieces are pushed maximumly, adjacent engaging pieces stop at different levels. By contrast, the thread groove in the outer circumference of the bolt is spiral, and hence the height of the thread is varied when the circumferential position is changed. When all the tip end portions of the engaging pieces are at the same level, therefore, the tip end portion of one of the engaging pieces overrides the thread. When adjacent engaging pieces stop at different levels as described above, however, each of the engaging pieces can engage with the thread groove, and rattling can be effectively prevented. The insertion resistances of the two engaging pieces are reduced, and therefore also the whole insertion resistance is reduced. Consequently, the insertion property can be improved.

According to a third aspect of the invention, there is provided a push nut according to the first aspect wherein the tip end portion of each engaging pieces inclines with an inclination angle with respect to the base plate; wherein one of the engaging pieces of each pair of the engaging pieces is larger in the inclination angle than another of the engaging pieces of the each pair of engaging pieces extended from a same side as the one of the engaging pieces; and wherein the ones of the engaging pieces being larger in the inclination angle are obliquely opposed to each other.

According to the above configuration, the engaging piece in which the angle of inclination of the tip end portion is small has a lower insertion resistance, and hence is pushed more inwardly. Therefore, adjacent engaging pieces stop at different levels. As a result, for the same reason as described above, each of the engaging pieces can engage with the thread groove, and rattling can be effectively prevented. The insertion resistances of the two engaging pieces are reduced, and therefore also the whole insertion resistance is reduced. Consequently, the insertion property can be improved.

According to a fourth aspect of the invention, there is provided provides a push nut according to the first aspect wherein each of the engaging pieces is folded back to have a U-shape in a thickness direction at the base portion of each engaging piece; wherein an intermediate portion of each engaging pieces extend to an outer side in a width direction of each engaging pieces; and wherein the tip end portion extends toward the bolt passing hole and inclines toward the insertion direction of the bolt.

According to the above configuration, in each of the engaging pieces, the length between a portion coupled to the base plate and the tip end portion can be increased as far as possible. Then the elastic force of the engaging piece can be enhanced. Therefore, the resistance of insertion onto the bolt can be reduced. Moreover, the base portions of two engaging pieces which extend from the same side of the base plate can be made close to each other, and hence it is easy to simultaneously press the two engaging pieces by one finger. Furthermore, the tip end portions of the four engaging pieces can be placed so as to evenly surround the periphery of the bolt passing hole. Therefore, the insertion resistance during insertion onto the bolt can be prevented from being biased, and the push nut can be prevented as far as possible from inclining in the process of being inserted.

As described above, according to a further aspect of the invention, the insertion force to be applied on the bolt can be reduced to a relatively small degree. On the way to push onto the bolt, the push nut hardly inclines with respect to the bolt. Even when the push nut inclines with respect to the bolt, the case where insertion is disabled does not occur. Therefore, the workability of attachment can be improved. Two of the engaging pieces extend from each of the pair of opposing sides of the base plate. Therefore, the push nut can be pushed by two fingers while two engaging pieces are simultaneously pressed by one of the fingers, and the push nut can be easily attached even in the case where the attachment work is conducted in a space where only the index and mid fingers can reach the engaging pieces. Since the shape in a developed state can be compact, the material yield of the production process can be improved.

BRIEF DESCRIPTION OF THE DRAWINGS

Embodiments of the present invention will be described in detail based on the following figures, wherein.

DETAILED DESCRIPTION OF THE INVENTION

Hereinafter, an embodiment of the invention will be described with reference to the drawings.

Figure 1:
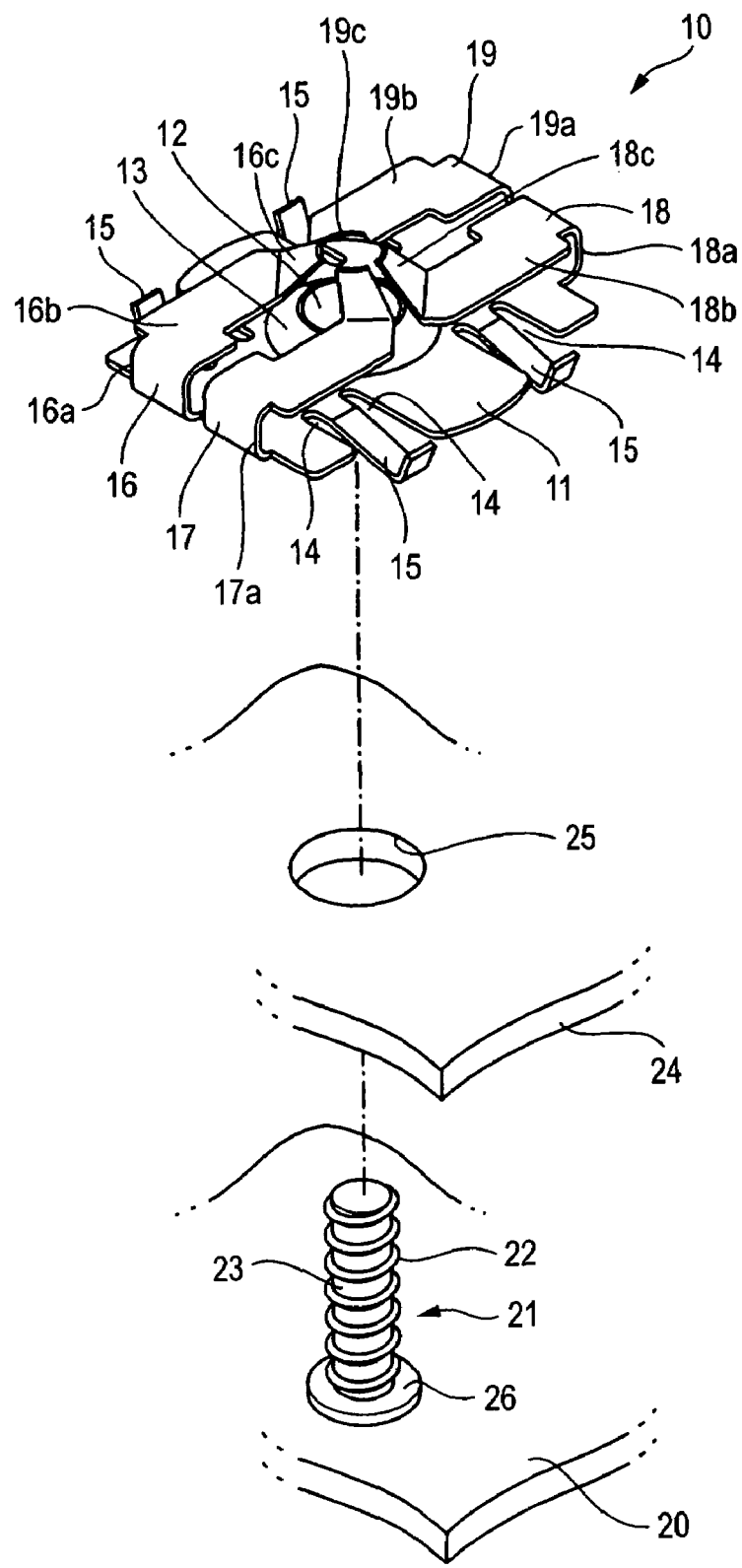
FIG. 1 is a perspective view showing a state where an attached plate is attached to a panel with using a push nut which is an embodiment of the invention.
Figure 2:
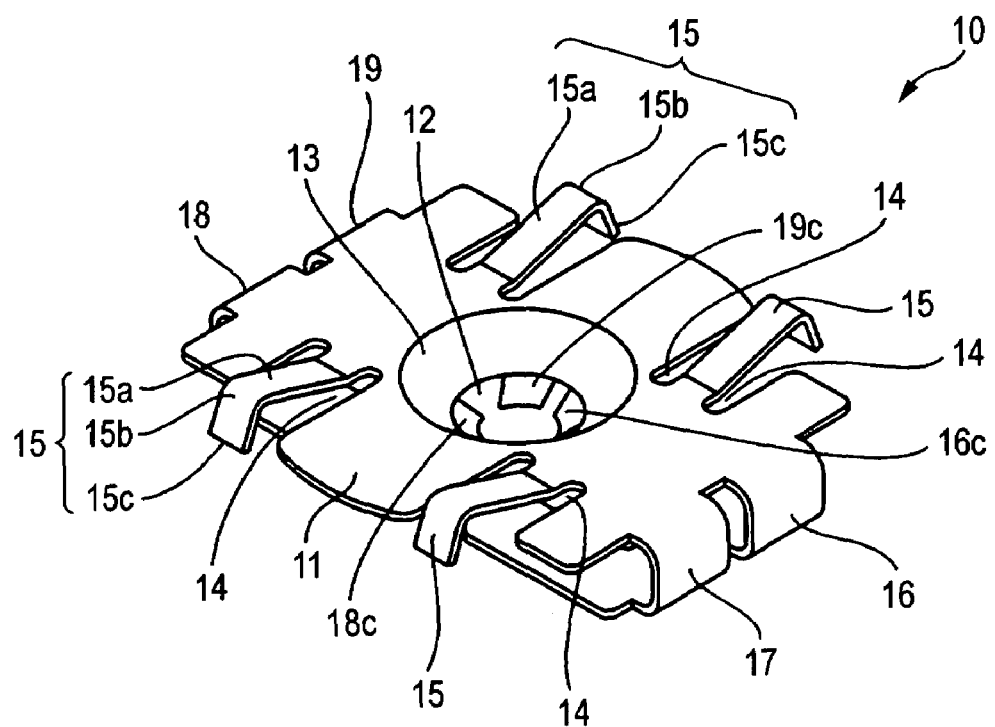
FIG. 2 is a perspective view of the push nut as viewed from the side of the lower face.
Figure 3A:
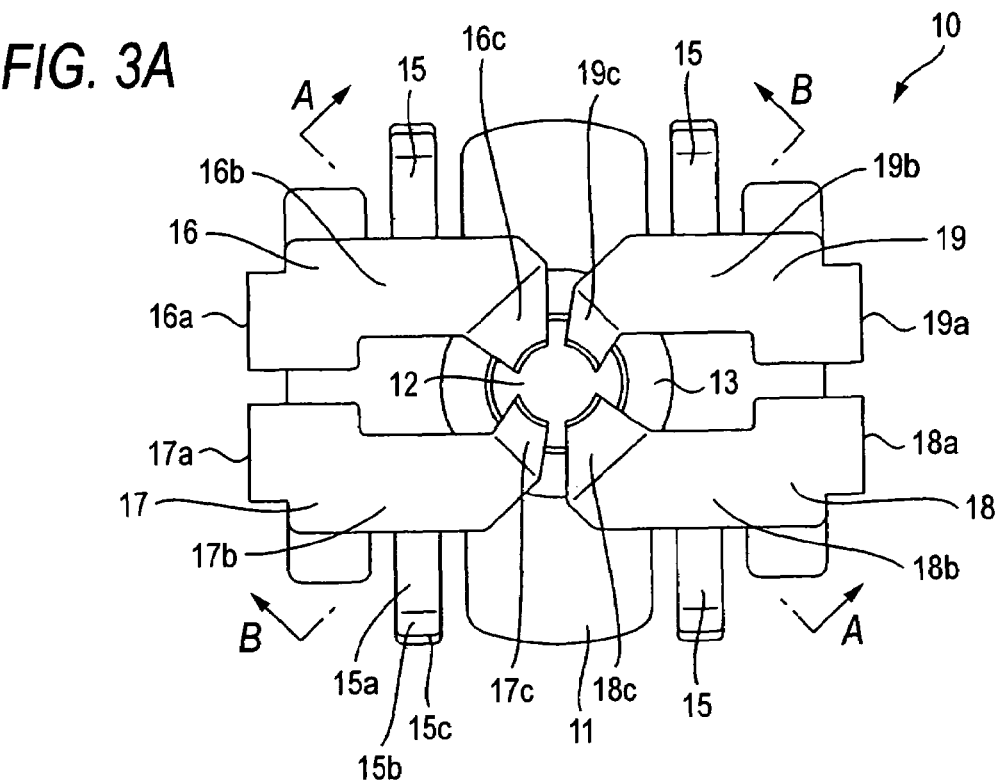
FIG. 3A is a front view of the push nut.
Figure 3B:
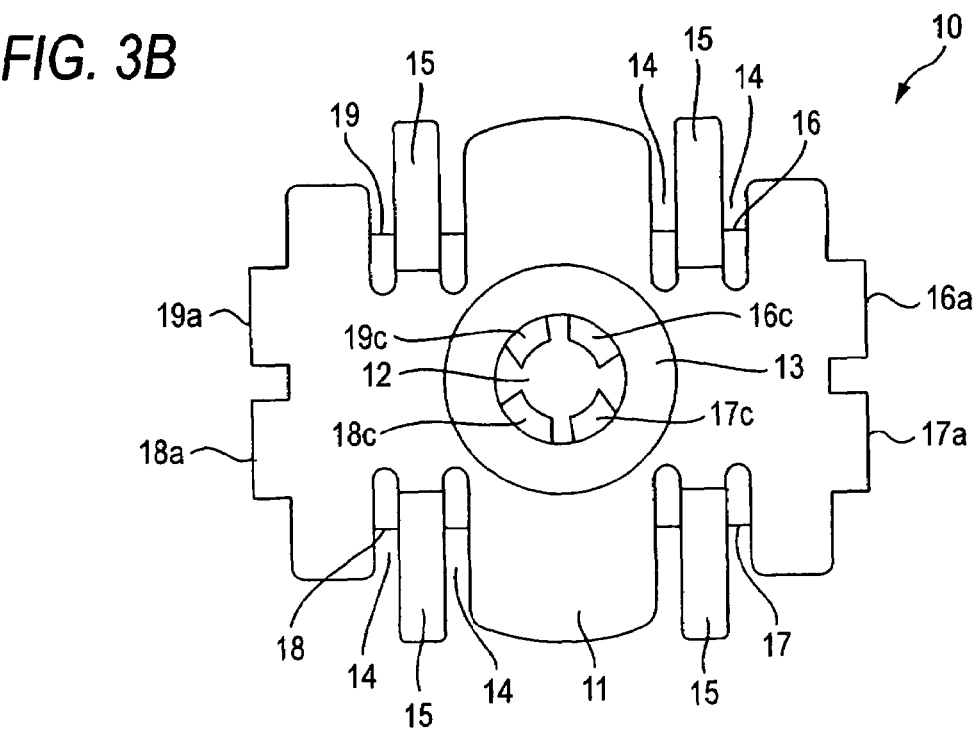
FIG. 3B is a rear view of the push nut.
Figure 4A:
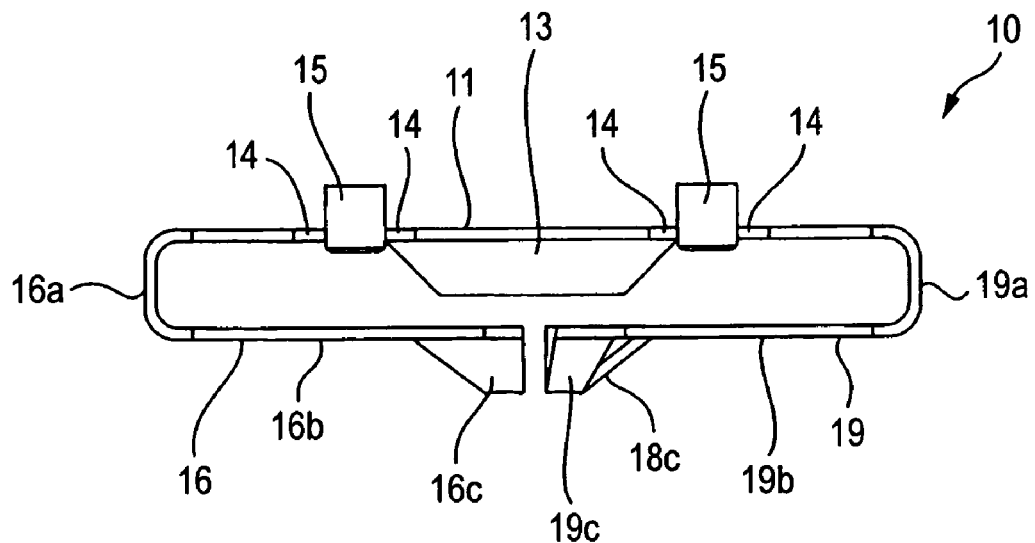
FIG. 4A is a plan view of the push nut.
Figure 4B:
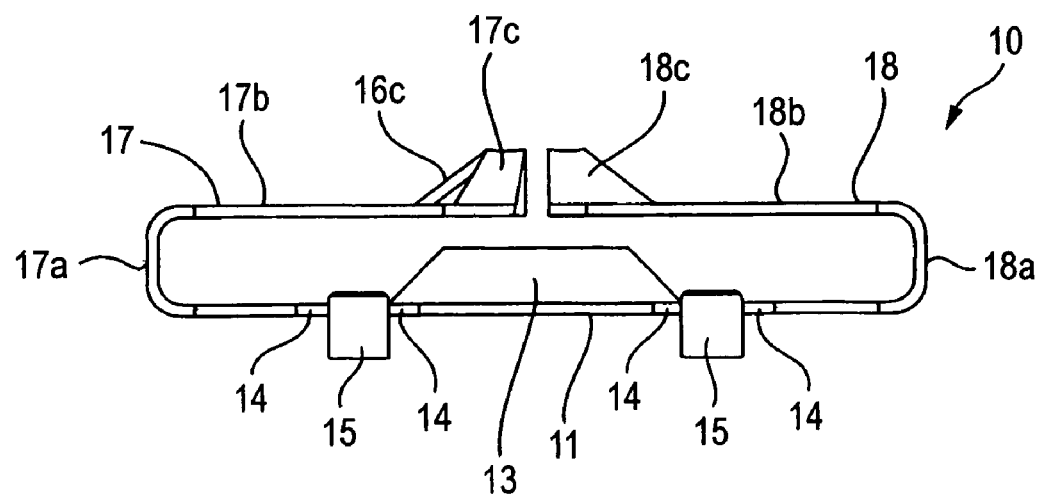
FIG. 4B is a bottom view.
Figure 5A:
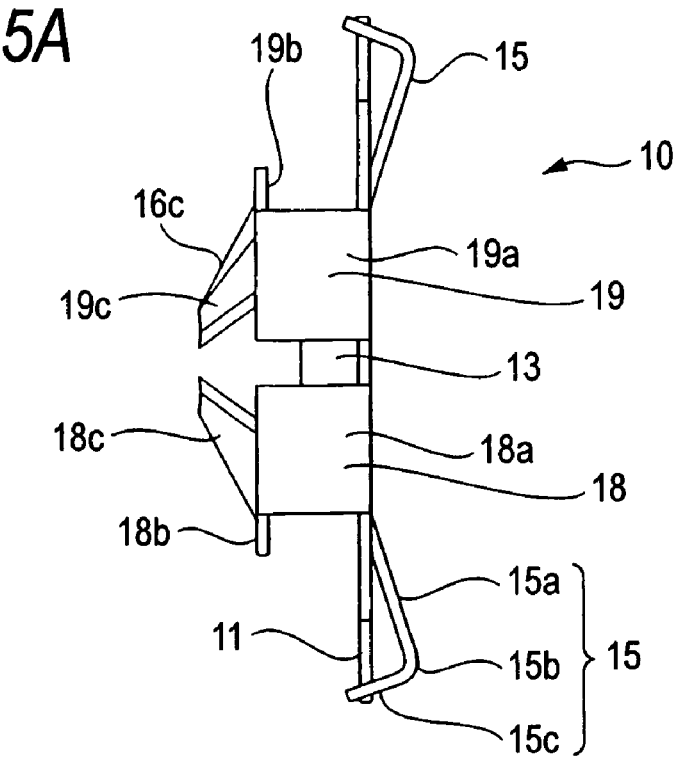
FIG. 5A is a right side view of the push nut.
Figure 5B:
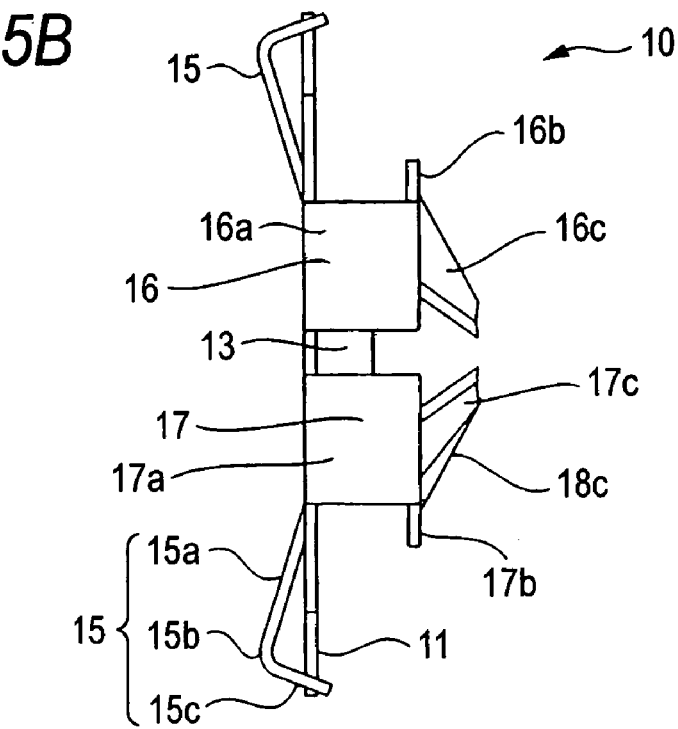
FIG. 5B is a left side view of the push nut.

FIG. 1 is a perspective view showing a state where an attached plate is attached to a panel using a push nut which is an embodiment of the invention. FIG. 2 is a perspective view of the push nut as viewed from the side of the lower face. FIG. 3A is a front view of the push nut, and FIG. 3B is a rear view of the push nut. FIG. 4A is a plan view of the push nut, and FIG. 4B is a bottom view of the push nut. FIG. 5A is a right side view of the push nut, and FIG. 5B is a left side view of the push nut.

Figure 6A:
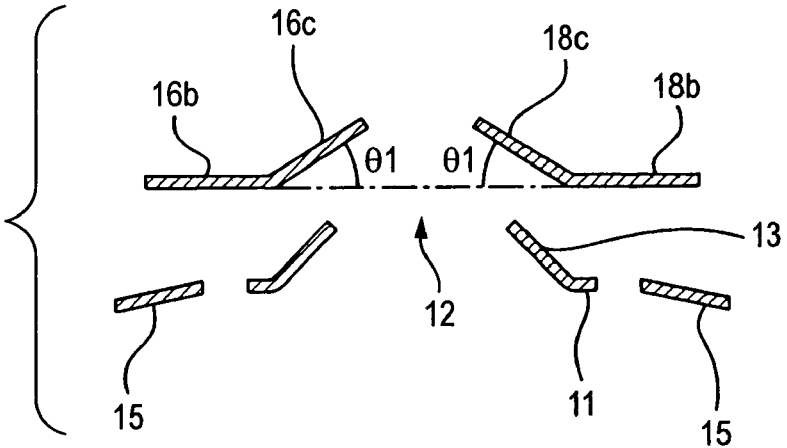
FIG. 6A is an end view of the push nut taken along the arrow line A-A of FIG. 3A.
Figure 6B:
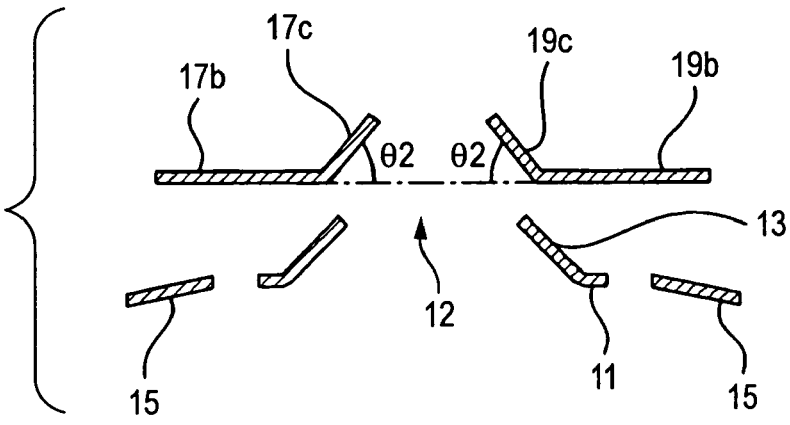
FIG. 6B is an end view taken along the arrow line B-B of FIG. 3A.
Figure 7A:
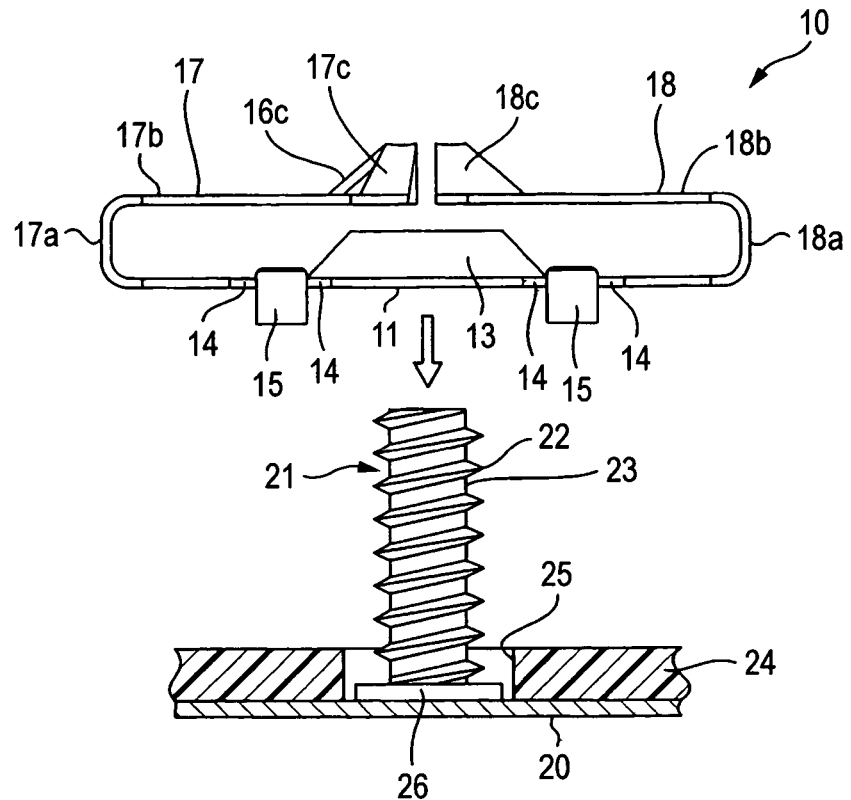
FIGS. 7A and 7B are views illustrating a state where the attached plate is to be fixed to the panel with using the push nut.
Figure 7B:
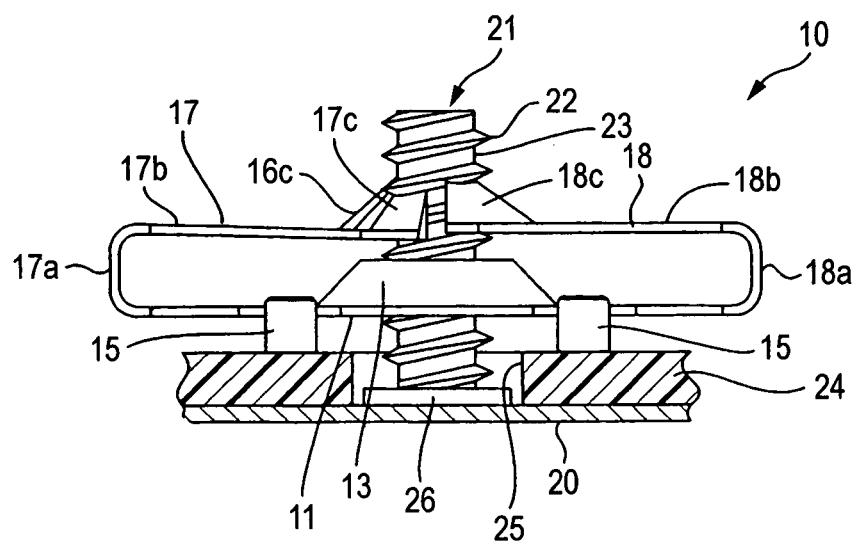
Figure 8:
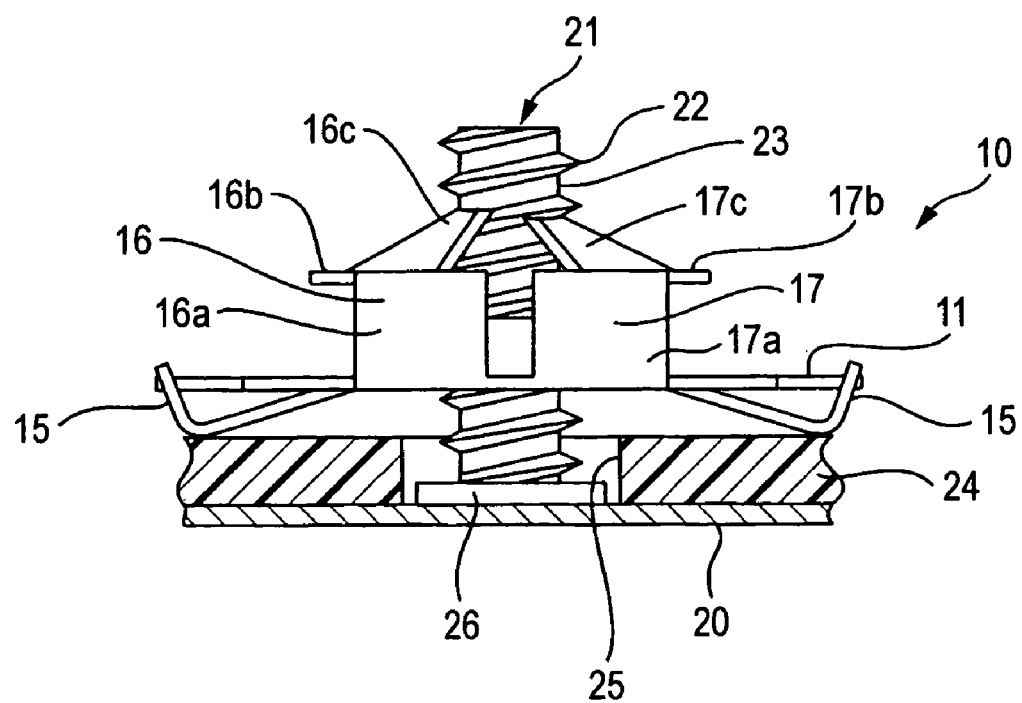
FIG. 8 is a section view showing a state where the attached plate is fixed to the panel with using the push nut.

FIG. 6A is an end view of the push nut taken along the arrow line A-A of FIG. 3A, and FIG. 6B is an end view of the push nut taken along the arrow line B-B of FIG. 3A. FIGS. 7A and 7B are views illustrating a state where the attached plate is to be fixed to the panel using the push nut. FIG. 8 is a section view showing a state where the attached plate is fixed to the panel using the push nut.

As shown in FIG. 1, the push nut 10 has a base plate 11 which has a substantially rectangular shape as a whole. A bolt passing hole 12 is formed at a center portion of the base plate 11. The peripheral edge of the bolt passing hole 12 is formed as a taper wall 13 which is raised upward. The embodiment will be described with reference also to FIG. 2. During a process of inserting a bolt 21 which will be described later into the bolt passing hole 12, the taper wall 13 facilitates the introduction of the bolt 21 into the bolt passing hole 12.

In the embodiment, the downward direction means a direction toward a base end of the bolt 21, and the upward direction means the insertion direction of the bolt 21.

Two pressing pieces 15 each of which is separated by a pair of slits 14 notched in a direction perpendicular to the long side are formed in each of a pair of sides of the base plate 11 which oppose to each other in the long side direction. Each of the pressing pieces 15 is formed so that a base portion 15a is bent downward, an intermediate portion 15b which is slightly in front of the tip end is upward bent, and a tip end portion 15c is directed obliquely upward. When the push nut 10 is pressed against a attached plate 24 which will be described later, the pressing pieces 15 elastically abut against the attached plate 24.

First and second engaging pieces 16, 17 extend from one of a pair of sides of the base plate 11 which oppose to each other in the short side direction. Third and fourth engaging pieces 18, 19 extend from the other side. In the engaging pieces 16, 17, 18, 19, base portions 16a, 17a, 18a, 19a are folded back in the plate thickness direction to have U-shapes, and tip end portions 16*c*, 17*c*, 18*c*, 19*c* are placed so as to surround a periphery of the bolt passing hole 12 above the bolt passing hole 12.

The embodiment will be described in further detail with reference also to FIGS. 3, 4, and 5. The engaging pieces 16, 17, 18, 19 are folded back in the plate thickness direction to have U-shapes in the base portions 16*a*, 17*a*, 18*a*, 19*a*, intermediate portions 16*b*, 17*b*, 18*b*, 19*b* extend to the outside in the plate width direction, and the tip end portions 16*c*, 17*c*, 18*c*, 19*c* are placed so as to be directed toward the center of the bolt passing hole 12, and to surround the periphery of the bolt passing hole 12.

Furthermore, the tip end portions 16*c*, 17*c*, 18*c*, 19*c* incline obliquely upward in the insertion direction of the bolt 21. As shown in FIG. 3, particularly, the first and second engaging pieces 16, 17 which extend from one of the sides of the base plate 11 in the short side direction are configured so that the width of the tip end portion 17*c* of the second engaging piece 17 is narrower than that of the tip end portion 16*c* of the first engaging piece 16. Similarly, the third and fourth engaging pieces 18, 19 which extend from the other side are configured so that the width of the tip end portion 19*c* of the fourth engaging piece 19 is narrower than that of the tip end portion 18*c* of the third engaging piece 18. As a result, the second and fourth engaging pieces 17, 19 each having the narrower tip end portion are obliquely opposed to each other.

FIG. 6A is an end view taken along the arrow line A-A of FIG. 3A which passes through the tip end portions 16*c*, 18*c* of the first and third engaging pieces 16, 18. By contrast, FIG. 6B is an end view taken along the arrow line B-B of FIG. 3A which passes through the tip end portions 17*c*, 19*c* of the second and forth engaging pieces 17, 19.

The tip end portions 16*c*, 18*c* of the first and third engaging pieces 16, 18 incline obliquely upward at an angle θ1 with respect to the intermediate portions 16*b*, 18*b*. By contrast, the tip end portions 17*c*, 19*c* of the second and fourth engaging pieces 17, 19 incline obliquely upward at an angle θ2 which is larger than the angle θ1 with respect to the intermediate portions 17*b*, 19*b*. In other words, the tip end portions 17*c*, 19*c* of the second and fourth engaging pieces 17, 19 have a shape in which the width is narrower and the upward inclination angle is larger as compared with the tip end portions 16*c*, 18*c* of the first and third engaging pieces 16, 18.

Next, a method of using the push nut 10 will be described.

In the embodiment, a method of fixing the attached plate 24 via the bolt 21 which upstands from a panel 20 will be described. The head 26 of the bolt 21 is welded and fixed to the panel 20. A hole 25 through which the bolt 21 is to be passed is formed in the attached plate 24. A thread 22 and a thread groove 23 are formed in the outer periphery of the bolt 21.

As shown in FIG. 7A, first, the bolt 21 is inserted through the hole 25 of the attached plate 24, and the attached plate 24 is caused to abut against the panel 20. Then, the bolt 21 is inserted into the bolt passing hole 12 from the lower face side of the push nut 10. Actually, this work is done by holding the push nut 10 by a worker, introducing the bolt 21 into the bolt passing hole 12, and pushing the push nut 10 onto the bolt 21.

At this time, the worker can push the push nut while the upper faces of the first and second engaging pieces 16, 17 which extend from one of the opposing sides are pressed by one finger, and those of the third and fourth engaging pieces 18, 19 which extend from another of the opposing sides are pressed by another finger. In this way, the push nut can be pushed while the four engaging pieces 16, 17, 18, 19 are pressed by the two fingers. Therefore, the push nut can be easily attached even in the case where, for example, the attachment work is conducted in a space where only one hand can be inserted and only the index and mid fingers can reach the engaging pieces.

When the push nut 10 is further pushed, as shown in FIG. 7B, the push nut 10 downward moves while the tip end portions 16*c*, 17*c*, 18*c*, 19*c* of the engaging pieces 16, 17, 18, 19 override the thread 22, and the pressing pieces 15 abut against the attached plate 24. When the push nut 10 is pushed by a stronger force in this state, the pressing pieces 15 bend upward to abut against the upper face of the attached plate 24. Moreover, the engaging pieces 16, 17, 18, 19 bend downward, and their tip end portions 16*c*, 17*c*, 18*c*, 19*c* are fitted into the thread groove 23 of the bolt 21 to engage therewith.

In this case, since the tip end portions 17*c*, 19*c* of the second and forth engaging pieces 17, 19 are narrower and incline upward at a larger angle as compared with the tip end portions 16*c*, 18*c* of the first and third engaging pieces 16, 18, pushing can be conducted more easily even when the same force is applied. As a result, as shown in FIGS. 7B and 8, the lowered positions of the narrower tip end portions 17*c*, 19*c* are shifted in the axial direction from those of the wider tip end portions 16*c*, 18*c*, and hence the tip end portions easily engage with the thread groove 23 of the bolt 21. Namely, when all the tip ends portions 16*c*, 17*c*, 18*c*, 19*c* are at the same level, a state in which one of the tip end portions overrides the thread 22 and fails to engage with the thread groove 23 is produced because the thread groove 23 is spiral, thereby causing rattling. In the push nut 10 according to the embodiment, the shapes of the tip end portions 16*c*, 17*c*, 18*c*, 19*c* of the engaging pieces 16, 17, 18, 19 are made different, and hence the positions to which the respective tip end portions are maximumly pushed are shifted, so that they can easily engage with the spiral thread groove 23.

In this way, the tip end portions 16*c*, 17*c*, 18*c*, 19*c* of the engaging pieces 16, 17, 18, 19 engage with the thread groove 23 of the bolt 21, whereby locking is attained, the push nut 10 is caused to abut against the upper face of the attached plate 24 via the pressing pieces 15, and the attached plate 24 can be firmly attached to the panel 20 without producing rattling.

For example, the push nut 10 can be produced by punching out a metal plate which is made of a metal such as spring steel, and which preferably has a thickness of 0.4 to 0.6 mm, and then press-molding the plate. In this case, a development shape of the push nut 10 can be formed as a compact shape which can fit into a predetermined rectangle. Therefore, the material yield is high, and the production cost can be reduced.

Embodiments according to the invention can be used as a push nut which is caused to engage with a thread groove of a bolt simply by being pushed onto the bolt, and which functions as a nut.

The entire disclosure of Japanese Patent Application No. 2005-132808 filed on Apr. 28, 2005 including specification, claims, drawings and abstract is incorporated herein be reference in its entirety.

What is claimed is:

1. A push nut comprising:
   a base plate formed with a bolt passing hole at a center of the base plate; and
   four engaging pieces wherein pairs of engaging pieces extend respectively from a pair of opposing sides of the base plate, base portions of the four engaging pieces are folded back to have a U-shape, and tip end portions of the engaging pieces extend to a surrounding of the bolt passing hole,
   wherein the tip end portions of the four engaging pieces surround a periphery of the bolt passing hole, wherein the four engaging pieces incline toward an insertion direction of a bolt and elastically abut against an outer circumference of the bolt, which is inserted into the bolt passing hole, wherein, in a first pair of engaging pieces that extend from one side, a width of the tip end portion of one engaging piece is less than a width of the tip end portion of another engaging piece, wherein, in a second pair of engaging pieces that extend from the other side, a width of the tip end portion of one engaging piece is less than a width of the tip end portion of another engaging piece, and wherein the one engaging piece of the first pair and the one engaging piece of the second pair are obliquely opposed.

2. The push nut according to claim 1, wherein each of the engaging pieces includes:
- a proximal portion that is folded back from a corresponding side of the base plate;
- an intermediate portion that extends from the proximal portion toward the bolt passing hole; and
- the tip end portion that is connected with the intermediate portion, and wherein, in each of the first and second pairs of engaging pieces, a space between the intermediate portions is greater than a space between the proximal portions.

3. The push nut according to claim 2, wherein each of the engaging pieces is folded back to have a U-shape in a thickness direction at the base portion of each engaging piece, wherein an intermediate portion of each engaging piece extends to an outer side in a width direction of each engaging piece, and wherein the tip end portion extends toward the bolt passing hole and inclines toward the insertion direction of the bolt.

4. The push nut according to claim 2, wherein the tip end portion of each engaging piece inclines with an inclination angle with respect to an intermediate portion of each engaging piece, wherein one of the engaging pieces of each pair of the engaging pieces is larger in the inclination angle than another of the engaging pieces of each pair of the engaging pieces, wherein the ones of the engaging pieces being larger in the inclination angle are obliquely opposed to each other, wherein each of the engaging pieces is folded back to have a U-shape in a thickness direction at the base portion of each engaging piece, wherein the intermediate portion of each engaging pieces extends to an outer side in a width direction of each engaging piece, and wherein the tip end portion extends toward the bolt passing hole and inclines toward the insertion direction of the bolt.

5. The push nut according to claim 1, wherein the tip end portion of each engaging piece inclines with an inclination angle with respect to an intermediate portion of the each engaging piece, wherein one of the engaging pieces of each pair of the engaging pieces is larger in the inclination angle than another of the engaging pieces of the each pair of engaging pieces extended from a same side as the one of the engaging pieces, and wherein the ones of the engaging pieces being larger in the inclination angle are obliquely opposed to each other.

6. The push nut according to claim 1, wherein the tip end portion of each engaging piece inclines with an inclination angle with respect to an intermediate portion of the each engaging piece, wherein one of the engaging pieces of each pair of the engaging pieces is larger in the inclination angle than another of the engaging pieces of each pair of the engaging pieces, and wherein the ones of the engaging pieces being larger in the inclination angle are obliquely opposed to each other.

7. The push nut according to claim 1, wherein the base plate has a substantially rectangular shape when viewed from the insertion direction of the bolt.

8. The push nut according to claim 7, wherein pairs of engaging pieces extend from a pair of sides of the rectangle by a distance which is less than a length of the other pair of sides of the rectangle.

9. The push nut according to claim 1, further comprising a plurality of pressing pieces which extend from the base plate in a direction away from the bolt insertion direction and outwardly from the bolt passing hole.

10. The push nut according to claim 1, wherein a base plate area which forms the bolt passing hole comprises a flange which extends toward the bolt insertion direction.

11. A push nut comprising:
a base plate formed with a hole; and
first, second, third and fourth engaging pieces wherein the first and second engaging pieces extend from one side of the base plate, and the third and fourth engaging pieces extend from another side of the base plate opposing to the one side of the base plate, wherein each of the first to fourth engaging pieces is folded back to have a U-shape, wherein a part of a tip end of each of the first to fourth engaging pieces is in the hole when viewed from above, wherein each of the first to fourth engaging pieces inclines in a direction separating from the base plate, wherein, in the first and second engaging pieces that extend from one side, a width of the tip end portion of one engaging piece is less than a width of the tip end portion of the other engaging piece, wherein, in the third and fourth engaging pieces that extend from the other side, a width of the tip end portion of one engaging piece is less than a width of the tip end portion of the other engaging piece, wherein the one engaging piece of the one side and the one engaging piece of the other side are obliquely opposed.

12. The push nut according to the claim 11, wherein the tip end portion of each of the first to fourth engaging pieces inclines with an inclination angle with respect to an intermediate portion of each of the first to fourth engaging pieces, wherein the inclination angle of the tip end portion of the second engaging piece is less than the inclination angle of the tip end portion of the first engaging piece, wherein the inclination angle of the tip end portion of the fourth engaging piece is less than the inclination angle of the tip end portion of the third engaging piece, and wherein the second and fourth engaging pieces are obliquely opposed to each other when viewed from above.

13. The push nut according to the claim 11, wherein the width of the tip end portion of the second engaging piece is less than the width of the tip end portion of the first engaging piece, wherein the width of the tip end portion of the fourth engaging piece is less than the width of the tip end portion of the third engaging piece, and wherein the tip end portion of each of the first to fourth engaging pieces inclines with an inclination angle with respect to an intermediate portion of each of the first to fourth engaging pieces, wherein the inclination angle of the tip end portion of the second engaging piece is less than the inclination angle of the tip end portion of the first engaging piece, wherein the inclination angle of the tip end portion of the fourth engaging piece is less than the inclination angle of the tip end portion of the third engaging piece, and wherein the second and fourth engaging pieces are obliquely opposed to each other when viewed from above.

14. The push nut according to claim 11, wherein each of the first to fourth engaging pieces is folded back to have a U-shape in a thickness direction at the base portion of each of the first to fourth engaging pieces, wherein an intermediate portion of each of the first to fourth engaging pieces extends to an outer side in a width direction of each of the first to fourth engaging piece, and wherein the tip end portion of each of the first to fourth engaging piece extends toward the bolt passing hole and inclines toward the direction of separating from the base plate.

15. The push nut according to the claim 11, wherein the width of the tip end portion of the second engaging piece is less than the width of the tip end portion of the first engaging piece, wherein the width of the tip end portion of the fourth engaging piece is less than the width of the tip end portion of the third engaging piece, and wherein the tip end portion of each of the first to fourth engaging pieces inclines with an inclination angle with respect to an intermediate portion of each of the first to fourth engaging pieces, wherein the inclination angle of the tip end portion of the second engaging piece is less than the inclination angle of the tip end portion of the first engaging piece, wherein the inclination angle of the tip end portion of the fourth engaging piece is less than the inclination angle of the tip end portion of the third engaging piece, and wherein the second and fourth engaging pieces are obliquely opposed to each other when viewed from above, wherein each of the first to fourth engaging pieces is folded back to have a U-shape in a thickness direction at the base portion of each of the first to fourth engaging pieces, wherein the intermediate portion of each of the first to fourth engaging pieces extends to an outer side in a width direction of each of the first to fourth engaging piece, and wherein the tip end portion of each of the first to fourth engaging piece extends toward the bolt passing hole and inclines toward the direction of separating from the base plate.

16. The push nut according to claim 11, wherein the base plate has a substantially rectangular shape when viewed from above.

17. The push nut according to claim 11, further comprising a plurality of pressing pieces which extend from the base plate in a direction away from the bolt insertion direction and outwardly from the bolt passing hole.

18. The push nut according to the claim 11, wherein each of the engaging pieces includes:
 a proximal portion that is folded back from the corresponding side of the base plate;
 an intermediate portion that extends from the proximal portion toward the bolt passing hole; and
 the tip end portion that is connected with the intermediate portion, and wherein, in each of the first and second pairs of engaging pieces, a space between the intermediate portions are wider than a space between the proximal portions.

19. An attaching structure comprising:

a first panel;
a bolt fixed to the first panel;
a push nut comprising:
 a base plate formed with a bolt passing hole at a center of the base plate into which the bolt is inserted; and
 four engaging pieces wherein pairs of engaging pieces extend respectively from a pair of opposing sides of the base plate, base portions of the four engaging pieces are folded back to have a U-shape, and tip end portions of the engaging pieces extend to a surrounding of the bolt; and a second panel formed with a hole into which the bolt is inserted, wherein the four engaging pieces incline toward an insertion direction of the bolt and the tip end portion of the engaging pieces engages a thread of the bolt, wherein the second plate is disposed between the first panel and the push nut and attached to the first panel, wherein, in a first pair of engaging pieces that extend from one side, a width of the tip end portion of one engaging piece is less than a width of the tip end portion of the other engaging piece, wherein, in a second pair of engaging pieces that extend from the other side, a width of the tip end portion of one engaging piece is less than a width of the tip end portion of the other engaging piece, and wherein the one engaging piece of the first pair and the one engaging piece of the second pair are obliquely opposed.

20. The attaching structure according to claim 19, wherein the push nut further comprises a plurality of pressing pieces which extend from the base plate in a direction away from the bolt insertion direction and outwardly from the bolt passing hole.

* * * * *